(12) United States Patent
Seaman et al.

(10) Patent No.: US 11,001,230 B2
(45) Date of Patent: May 11, 2021

(54) LOAD STATUS OF TRANSPORT CHASSIS

(71) Applicant: BlackBerry Limited, Waterloo (CA)

(72) Inventors: Conrad Delbert Seaman, Ottawa (CA); Stephen West, Manotick (CA); Christopher Scott Travers, Ottawa (CA)

(73) Assignee: BlackBerry Limited, Waterloo (CA)

(*) Notice: Subject to any disclaimer, the term of this patent is extended or adjusted under 35 U.S.C. 154(b) by 743 days.

(21) Appl. No.: 15/622,475

(22) Filed: Jun. 14, 2017

(65) Prior Publication Data

US 2018/0361994 A1 Dec. 20, 2018

(51) Int. Cl.
| | |
|---|---|
| *B60R 25/30* | (2013.01) |
| *G01G 19/08* | (2006.01) |
| *G01G 1/00* | (2006.01) |
| *B60R 25/32* | (2013.01) |
| *B60R 25/33* | (2013.01) |
| *G01L 5/00* | (2006.01) |
| *G01M 17/007* | (2006.01) |
| *G01S 19/20* | (2010.01) |
| *G01V 3/08* | (2006.01) |
| *G01V 8/10* | (2006.01) |
| *G01V 9/00* | (2006.01) |

(52) U.S. Cl.
CPC ............ *B60R 25/307* (2013.01); *B60R 25/30* (2013.01); *B60R 25/32* (2013.01); *B60R 25/33* (2013.01); *G01G 1/00* (2013.01); *G01G 19/08* (2013.01); *G01L 5/00* (2013.01); *G01M 17/007* (2013.01); *G01S 19/20* (2013.01); *G01V 3/081* (2013.01); *G01V 8/10* (2013.01); *G01V 9/00* (2013.01); *B60R 2325/30* (2013.01); *B60R 2325/308* (2013.01)

(58) Field of Classification Search
None
See application file for complete search history.

(56) References Cited

U.S. PATENT DOCUMENTS

| | | | |
|---|---|---|---|
| 5,416,706 A | 5/1995 | Hagenbuch | |
| 10,003,379 B2 * | 6/2018 | Flood | H04W 72/02 |
| 2003/0204407 A1* | 10/2003 | Nabors | G06Q 10/08 |
| | | | 709/202 |
| 2004/0183673 A1* | 9/2004 | Nageli | G01S 5/0018 |
| | | | 340/539.13 |

(Continued)

FOREIGN PATENT DOCUMENTS

| | | |
|---|---|---|
| DE | 102004031224 A1 | 1/2006 |
| EP | 2275287 A2 | 1/2011 |

(Continued)

OTHER PUBLICATIONS

The Aluminium Automotive Manual, European Aluminium Association (Year: 2011).*
Duncan & Sons Expands Deployment of Container Chassis Tracking Solutions From Asset Intelligence I.D. Systems https://www.idsystems.com/duncansonsexpandsdeploymentofcontainerchassistrackingsolutionsfromassetintelligence/ Jun. 22, 2015 (5 pages).
Wikipedia, Intermodal container last modified on Apr. 11, 2017 (18 pages).

(Continued)

*Primary Examiner* — Roy Y Yi
(74) *Attorney, Agent, or Firm* — Trop, Pruner & Hu, P.C.

(57) ABSTRACT

In some examples, a system receives sensor data from a sensor of a transport chassis configured to carry a cargo transportation unit (CTU), and determines, based on the sensor data and a profile learned based on past data, whether the transport chassis is loaded with a CTU or cargo.

20 Claims, 3 Drawing Sheets

(56) References Cited

U.S. PATENT DOCUMENTS

| 2005/0072219 A1* | 4/2005 | Nelson | G01G 21/22 |
| | | | 73/65.01 |
| 2008/0136624 A1* | 6/2008 | Twitchell | G08C 17/02 |
| | | | 340/539.22 |
| 2011/0196623 A1 | 8/2011 | Hakkinen | |
| 2016/0265960 A1 | 9/2016 | Watanabe | |

FOREIGN PATENT DOCUMENTS

| WO | 2007021908 | 2/2007 |
| WO | 2016/179715 A1 | 11/2016 |

OTHER PUBLICATIONS

Orbcomm, IoT Sensors: Cargo Sensor, Trailer Sensor and Antennas, https://www.orbcomm.com/en/hardware/devices/sensorsantennas, 2017 (3 pages).
SkyBitz, SkyBitz Launches Comprehensive Chassis Tracking Solution for Intermodal Industry Technology Solution Lowers Costs for Chassis Owners Through Greater Utilization and Efficiencies, Feb. 29, 2016.
ISA/CA, International Search Report and Written Opinion for PCT/CA2018/050712 dated Sep. 5, 2018 (10 pages).
European Patent Office, Extended European Search Report for Appl. No. 18817203.5 dated Apr. 17, 2020 (10 pages).

* cited by examiner

LOAD STATUS OF TRANSPORT CHASSIS

BACKGROUND

A transport chassis is a support structure that can be used to carry a cargo transportation unit (CTU), such as a shipping container. The shipping container can be used to carry cargo. The transport chassis can be part of a truck, or alternatively, can be part of a trailer that has wheels. In an arrangement where there are a large number of transport chassis dispersed over a large geographical area, it can be difficult to determine which transport chassis are being used to carry cargo, and which are not.

BRIEF DESCRIPTION OF THE DRAWINGS

Some implementations of the present disclosure are described with respect to the following figures.

Figure 1:
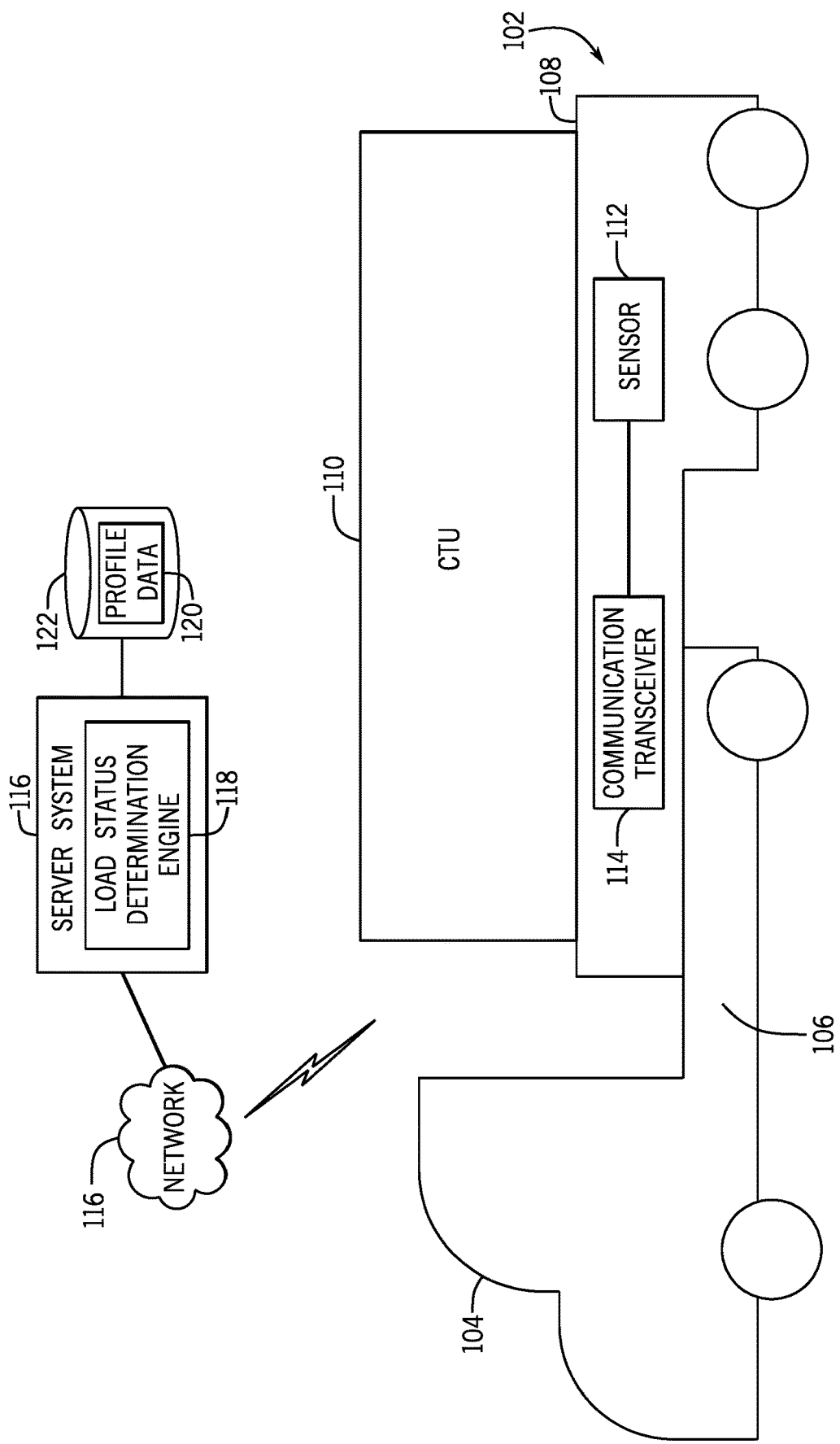
FIG. 1 is a block diagram of an example arrangement that includes a transport chassis according to some implementations.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A transport chassis can include any support structure that is designed to carry a cargo transportation unit (CTU), where a CTU is configured to carry cargo items. A "cargo item" can refer to any physical item that is to be delivered from one location to another location. "Cargo" can refer to one or more cargo items.

An example of a CTU is a shipping container that defines an inner chamber in which cargo can be placed. The shipping container can be enclosed on all sides, such that cargo items placed within the inner chamber of the shipping container are protected from the outside environment. In other examples, the shipping container can be partially open on at least one side, such as the top side, or a lateral side. In some examples, a shipping container can be referred to as an intermodal container. More generally, a CTU can refer to any platform or structure that is used to carry cargo.

In some cases, the transport chassis, although configured to carry a shipping container or other CTU, is able to also in some cases directly carry large cargo items, such as logs, large equipment, steel beams, and so forth.

A transport chassis can be part of a truck or a trailer (that is to be hauled by a tractor or other vehicle). More generally, a transport chassis is moveable by a vehicle between different geographic locations, for the purpose of carrying a CTU and/or cargo between different geographic locations. A transport chassis can be part of, mounted on, or attached, as applicable, to a vehicle, such as a truck, a trailer, a tractor, a car, a railed vehicle (e.g., a train), a watercraft (e.g., a ship), an aircraft, a spacecraft, and so forth.

An enterprise can manage a fleet of transport chassis. Examples of enterprises include shippers, manufacturers, distributors, retailers, individuals, or any other entity that is responsible for managing a fleet of transport chassis. The fleet of transport chassis can be owned by one or more other entities. The transport chassis of the fleet may be dispersed across a number of geographic locations (e.g., in many cities, states, provinces, countries, etc.).

An enterprise may want to know if each particular transport chassis is loaded or unloaded. A transport chassis is loaded (or has a loaded status) if the transport chassis is carrying a CTU and/or cargo. In other words, the transport chassis is loaded if a CTU is placed on the transport chassis (whether or not the CTU contains cargo), or alternatively, if cargo (such as one or more large cargo items) is placed directly on the transport chassis. A transport chassis is not loaded (or has an unloaded status) if no CTU and no cargo is placed on the transport chassis.

When there is a large number of transport chassis, whether concentrated at a particular location or dispersed across a large number of geographic locations, it can be difficult to ascertain in an automated manner whether or not the different transport chassis are loaded or unloaded. Determining the load status (loaded status or unloaded status) of a transport chassis can be useful for various purposes, including tracking usage of each transport chassis, determining billing for a transport chassis (e.g., computing an amount to bill a customer for actual use of a transport chassis to deliver a CTU and/or cargo of the customer), determining a maintenance schedule for a transport chassis (e.g., determining when the transport chassis should be taken to a maintenance facility for maintenance), detecting theft of the transport chassis, and so forth.

In some examples, a customer can be billed for actual use of the transport chassis, i.e., when the transport chassis is actually loaded with a CTU and/or cargo of the customer. Thus, if a particular transport chassis is loaded with the customer's CTU and/or cargo for a particular number of hours, then the customer can be billed for use of the particular transport chassis for those number of hours.

Maintenance of a transport chassis can be based on the amount of usage of the transport chassis in carrying CTUS or cargo. For example, the transport chassis may be scheduled for maintenance after actual use (when the transport chassis is loaded) for some specified amount of time or some specified distance. Once the specified amount of time or distance of actual use of the transport chassis is detected, the transport chassis can be taken to a maintenance facility for maintenance.

Theft of a transport chassis can be detected based on a determination of whether the transport chassis should have a loaded status but in fact is not loaded during a given time period. Alternatively, theft of a transport chassis can be detected based on a determination that the transport chassis is loaded when in fact the transport chassis is not supposed to be transporting a CTU or cargo. More generally, detection of an inconsistency between an actual load status and an expected load status of the transport chassis can provide an indication that theft of the transport chassis has occurred.

FIG. 1 shows an example arrangement where a transport chassis 102 is towed by a vehicle 104 (such as a tractor or other type of vehicle). In examples according to FIG. 1, the transport chassis 102 is separate from the vehicle 104, and the transport chassis 102 can be attached to a tow platform 106 of the vehicle 104 to allow the vehicle 104 to tow the transport chassis 102. In other examples, the vehicle 104 can be a truck, and the transport chassis 102 can be part of the truck 104.

In some examples, the vehicle 104 is a driverless vehicle that can be driven in an autonomous manner. In alternative examples, the vehicle 104 can be driven by a human driver.

In the example shown in FIG. 1, the transport chassis 102 has a bed 108 (or other type of support structure) on which a CTU 110 can be mounted. The CTU 110 has an inner chamber in which cargo can be carried. In other examples, although the transport chassis 102 is configured to carry the CTU 110, the transport chassis 102 is also able to directly carry cargo, such as large cargo items.

The transport chassis 102 includes a sensor 112 and a communication transceiver 114. The sensor 112 is able to acquire a measurement relating to the transport chassis 102. Although just one sensor 112 is shown in FIG. 1, it is noted that in other examples, the transport chassis 102 can include multiple sensors. Examples of various types of sensors are discussed further below.

The sensor 112 can be located at various different locations of the transport chassis 102. For example, where the transport chassis 102 has a bumper, the sensor 112 can be located under the bumper or on top of the bumper. Alternatively, the sensor 112 can be attached to a frame of the transport chassis 102. In other examples, the sensor 112 can be provided at a different part of the transport chassis 102.

The communication transceiver 114 is able to communicate over a network 116, which can be a wireless network. Examples of wireless networks include a cellular network, a wireless local area network (WLAN), and so forth. The communication transceiver 114 can communicate radio frequency (RF) signals over a wireless network, such as RF signals used in a cellular network or a WLAN.

An example cellular network can operate according to the Long-Term Evolution (LTE) standards as provided by the Third Generation Partnership Project (3GPP). The LTE standards are also referred to as the Evolved Universal Terrestrial Radio Access (E-UTRA) standards. In other examples, other types of cellular networks can be employed, such as second generation (2G) or third generation (3G) cellular networks, e.g., a Global System for Mobile (GSM) cellular network, an Enhanced Data rates for GSM Evolution (EDGE) cellular network, a Universal Terrestrial Radio Access Network (UTRAN), a Code Division Multiple Access (CDMA) 2000 cellular network, and so forth. In further examples, cellular networks can be fifth generation (5G) or beyond cellular networks. In additional examples, a wireless network can include a WLAN, which can operate according to the Institute of Electrical and Electronic Engineers (IEEE) 802.11 or Wi-Fi Alliance Specifications. In other examples, other types of wireless networks can be employed by the CTU controller 108 to communicate with a remote service, such as a Bluetooth link, a ZigBee network, and so forth. Additionally, some wireless networks can enable cellular IoT, such as wireless access networks according to LTE Advanced for Machine-Type Communication (LTE-MTC), narrowband IoT (NB-IoT), and so forth.

A server system 116 is also coupled to the network 116, either wirelessly or over a wired link. The server system 116 can be implemented using a computer or using multiple computers, which can be distributed across different locations, such as different locations of a state or province, a country, or the world. The server system 116 also includes a load status determination engine 118, which is able to determine a load status of the transport chassis 102.

The load status determination engine 118 can include a hardware processing circuit that can include any one or more of the following: a microprocessor, a core of a multi-core microprocessor, a microcontroller, a programmable gate array, a programmable integrated circuit device, or another type of hardware processing circuit. In further examples, the load status determination engine 118 can include a combination of a hardware processing circuit and machine-readable instructions (software or firmware) executable on the hardware processing circuit.

The communication transceiver 114 can send measurement data acquired by the sensor 112 over the network 116 to the server system 116. Based on the measurement data from the sensor 112, the load status determination engine 118 is able to determine a load status of the transport chassis 102. The load status determination engine 118 determining the load status of a transport chassis based on measurement data from a sensor can refer to the load status determination engine determining the load status of the transport chassis 102 based on measurement data from just a single sensor, or from multiple sensors.

Although FIG. 1 shows just one transport chassis 102, it is noted that the server system 116 can be used to determine the load status of multiple transport chassis. Each such transport chassis can include a respective sensor and communication transceiver to communicate over a network, such as the network 116, with the server system 116.

The load status determination engine 118 determines the load status of the transport chassis 102 based on the measurement data from the sensor 112, as well as profile data 120 stored in an information repository 122. The information repository 122 can be implemented with a storage system or multiple storage systems, where a storage system can include one or more disk-based storage devices and/or one or more solid state storage devices.

The profile data 120 represents a profile of the transport chassis 102 based on past measurement data collected for the transport chassis 102 (or for a number of transport chassis). The past measurement data can include data indicating ranges of measurement data from a sensor (or from multiple sensors) that indicate whether or not a transport chassis is loaded. For example, if the sensor 112 is a strain gauge that is used to measure strain on a suspension (or multiple suspensions) of the transport chassis, then the profile data 120 can specify that a first range of strain values indicates that a transport chassis is loaded, or a different second range of strain values indicates that the transport chassis is not loaded. In other examples, the profile data 120 can include ranges of other measurement data corresponding to respective loaded and unloaded status of transport chassis.

The profile data 120 can be continually updated as new measurement data is received and as determinations are made based on such new measurement data regarding whether or not the transport chassis is loaded. In some examples, user feedback or other feedback can be provided to indicate to the load status determination engine 118 whether the determination of load status made by the load status determination engine 118 based on a specific measurement data is correct. The update of the profile data 120 based on determinations of load status of the load status determination engine 118 and feedback regarding the correctness of the load status determinations is part of a process of learning the profile data. In this manner, by continually updating the profile data 120, the load status determination engine 118 can perform more accurate load status determinations as further measurement data is received from transport chassis.

Figure 2:
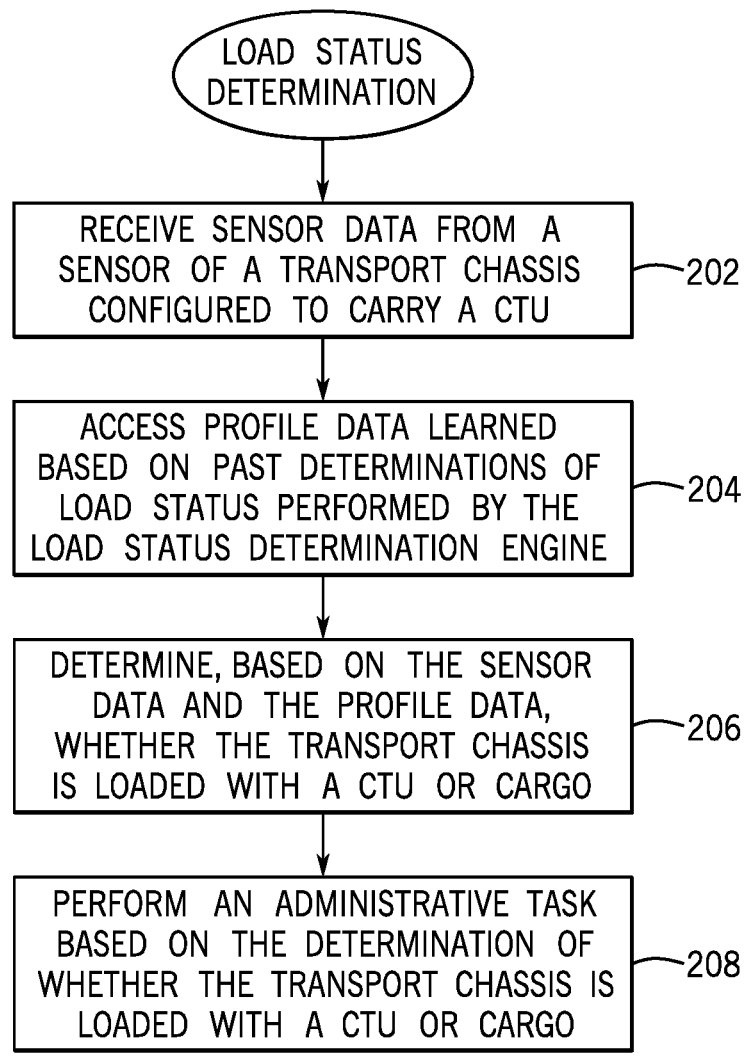
FIG. 2 is a flow diagram of a process of determining whether or not a transport chassis is loaded, according to some examples.

FIG. 2 is a flow diagram of a process performed by the load status determination engine 118, according to some examples. The load status determination engine 118 receives (at 202) sensor data from a sensor (e.g., 112) of a transport chassis (e.g., 102) configured to carry a CTU. The load status determination engine 118 accesses (at 204) profile data (e.g., 120) learned based on past determinations of load status performed by the load status determination engine 118.

The load status determination engine 118 further determines (at 206), based on the sensor data and the profile data, whether the transport chassis is loaded with a CTU or cargo.

The load status determination engine 118 further performs (at 208) an administrative task based on the determination of whether the transport chassis is loaded with a CTU or cargo. The administrative task can include one or more of tracking a usage of the transport chassis in carrying a CTU or cargo, determining billing for use of the transport chassis in carrying a CTU or cargo, determining whether maintenance is to be performed for the transport chassis, and detecting theft of the transport chassis.

As noted above, in some examples, the sensor 112 can include a strain gauge to measure strain on a part of the transport chassis 102, such as on a suspension of the transport chassis 102. In some examples, multiple strain gauges can measure strain of respective suspensions of the transport chassis 102. The suspension of the transport chassis 102 is a mechanism that is used to support the weight of the transport chassis, where the suspension can be attached to a wheel of the transport chassis. The strain gauge is used to measure a strain of the suspension or other part of the transport chassis 102. When the CTU 110 or cargo is loaded on the transport chassis 102, the strain gauge will measure a strain value within a first range of strain values. On the other hand, if the transport chassis 102 is not loaded with either a CTU or cargo, then the strain gauge will measure a strain value within a second range of strain values, where the second range is different from the first range.

In other examples, the sensor 112 can include a signal characteristic sensor that is able to measure a signal characteristic of a wireless signal that is communicated by a wireless module (which can include the communication transceiver 114 of FIG. 1) over a wireless network (e.g., 116 in FIG. 1). In some examples, the signal characteristic that is measured by the signal characteristic sensor can include an amplitude of the signal, a phase of the signal, a signal-to-noise ratio (SNR) of the signal, or any other signal characteristic. When a CTU or cargo is loaded on the transport chassis 102, the signal characteristic sensor 112 measures a signal characteristic value that is within a first range of signal characteristic values. For example, the presence of the CTU or cargo on the transport chassis 102 can interfere with wireless transmission by the communication transceiver 114, such that the amplitude of a transmitted signal is decreased or the noise level associated with the wireless signal is increased (which leads to a decreased SNR). In contrast, when the transport chassis 102 is not loaded with a CTU or cargo, then the wireless transmission of a signal by the communication transceiver 114 is not interfered with by a CTU or cargo, such that the signal characteristic sensor can measure a signal characteristic value within a second range of signal characteristic values. Although reference is made to examples where the signal characteristic sensor measures signals wirelessly transmitted by the communication transceiver 114, it is noted that in other examples, the signal characteristic sensor can measure a signal characteristic of a wireless signal being received by the communication transceiver 114 (where this wireless signal is transmitted by a wireless network node that is part of the wireless network 116).

In further examples, instead of monitoring signal characteristics of wireless signals communicated (transmitted or received) by the communication transceiver 114 with a wireless network, the signal characteristic sensor can be used to monitor GPS signals received by a GPS receiver of the transport chassis 102. GPS signals are transmitted by satellites and received by the GPS receiver. Presence of a CTU or cargo on the bed 108 of the transport chassis 102 can interfere with the reception of GPS signals by the GPS receiver.

Over time, the profile data 120 that correlates ranges of signal characteristic values to a loaded or unloaded status of a transport chassis can be updated as measurements are made, and load status determinations are performed. Any feedback that is provided regarding the correctness of the load status performed by the load status determination engine 118 can be used to adjust the profile data 120.

In other examples, the sensor 112 of the transport chassis 102 can include an optical sensor. For example, the optical sensor can be a time-of-flight (ToF) sensor. With a ToF sensor, a light source can be used to emit light that is propagated in a particular direction. For example, the direction of the light propagated by the light source can be in a general direction of where a CTU or cargo would be if loaded on the bed 108 of the transport chassis 102. If the ToF sensor detects reflected light that is above a specified threshold, then that is an indication that the transport chassis 102 is loaded with a CTU or cargo. On the other hand, if the amount of reflected light received by the optical sensor is less than the specified threshold, then that is an indication that the transport chassis 102 is not loaded. The threshold at which the detection of a loaded status or unloaded status is performed can be part of the profile data 120 that can be learned over time by the load status determination engine 118. The profile data 120 can thus correlate a first range of optical signal characteristics (e.g., amplitude of a reflected optical signal being less than a specified threshold) with an unloaded status of the transport chassis 102, and a second range of optical signal characteristics (e.g., amplitude of a reflected optical signal being greater than the specified threshold) with a loaded status of the transport chassis 102.

In further examples, the sensor 112 can include a magnetic field sensor, which can detect a characteristic of a magnetic field of the transport chassis 102. Presence of a CTU or cargo, which can be formed of a material that can interfere with or otherwise distort a magnetic field, can cause a characteristic of a magnetic field to deviate from an expected profile. If the CTU or cargo is not present, then the characteristic of a measured magnetic field as detected by the magnetic field sensor can be more consistent with the expected magnetic field profile. The profile data 120 can correlate different magnetic field profiles to a respective load status and unloaded status of the transport chassis 102.

In further examples, the sensor 112 can include an accelerometer. The accelerometer can be used to detect an acceleration due to force imparted on the transport chassis 102 when a CTU or cargo is dropped onto the bed 108 of the transport chassis 102. Detection of an acceleration along a particular direction (e.g., vertical direction) that exceeds a specified threshold can be an indication that the transport chassis 102 is loaded. The acceleration threshold is set to distinguish between acceleration due to forces detected by the accelerometer when the transport chassis 102 is moving over a road (where forces can be applied by the road surface, including potholes or speed bumps) and acceleration due to force applied by dropping a CTU or cargo onto the bed 108 of the transport chassis 102. This threshold can be learned over time and can be stored as part of the profile data 120.

In further examples, the sensor 112 can include a camera to capture the sky. If the sky is visible, then that is an indication that a CTU or cargo is not loaded on the transport chassis 102. On the other hand, if the sky is not visible (or only partially visible), then that is an indication that the transport chassis 102 is loaded.

Although the foregoing refers to examples where use of just one sensor is assumed, it is noted that in further examples, measurement data from multiple sensors can be used for determining, by the load status determination engine 118, whether the transport chassis 102 is loaded. For example, the load status determination engine 118 can receive a series of events that correspond to measurements made by different sensors of the transport chassis 102. A first event can be created in response to an acceleration detected by an accelerometer that exceeds a specified acceleration threshold. A second event can include an event generated in response to a camera no longer being able to see the sky. A third event can include an event generated based on measurement of a strain that exceeds a specified strain threshold by a strain gauge. The series of events can be collected by the load status determination engine 118, and based on the series of events, the load status determination engine 118 can determine whether the transport chassis 102 is loaded or not loaded.

This series of events can be compared to the profile data 120, and based on this comparison, the determination can be made. In such examples, the profile data 120 can correlate combinations ranges or profiles of measurement data of different types of sensors with a respective loaded status or unloaded status of a transport chassis.

In some examples, weights can be assigned to each event, where a weight can indicate some likelihood that the respective event indicates a loaded status of the transport chassis 102. For example, a first event can indicate a first likelihood of a loaded status of the transport chassis 102, a second event can indicate a second likelihood of a loaded status of the transport chassis 102, and a third event can indicate a third likelihood of a loaded status of the transport chassis 102. These different likelihoods can be combined (such as by taking an average, taking a sum, and so forth), and the combined likelihood value can then be used to determine whether or not the transport chassis 102 is loaded.

Figure 3:
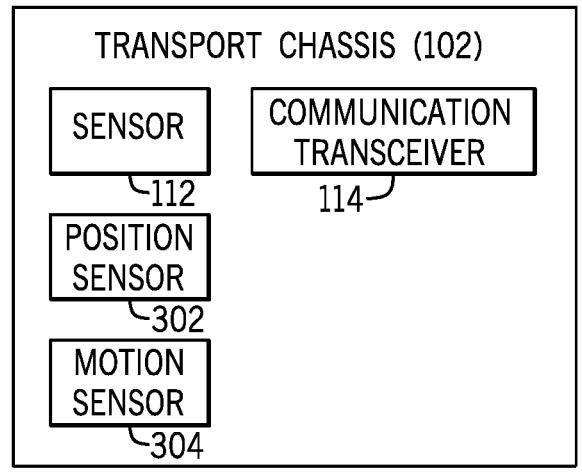
FIG. 3 is a block diagram of components of a transport chassis, according to further examples.

The determination of the load status of the transport chassis 102 by the load status determination engine 118 can further be based on a location of the transport chassis 102. In some examples, as shown in FIG. 3, the transport chassis 102 can include a position sensor 302 to determine a location of the transport chassis 102. For example, the position sensor 302 can include a GPS receiver or a position sensor that is able to determine the location of the transport chassis 102 based on wireless signals received from a wireless network, such as based on triangulation of wireless signals received from base stations or access points having known locations.

Alternatively, or additionally, the transport chassis 102 also includes a motion sensor 304 that is able to detect motion of the transport chassis 102. The motion sensor 304 can include an accelerometer, a speedometer, and so forth.

Based on the location or movement of the transport chassis 102 (as determined from the position data and/or motion data from the position sensor 302 and/or motion sensor 304), the load status determination engine 118 can determine that an event is occurring with the transport chassis 102. For example, if the transport chassis 102 is moving, then that is an indication that something is happening with the transport chassis 102. For example, the transport chassis 102 may be moved to a location to load a CTU or cargo, or to unload a CTU or cargo. Alternatively, motion can indicate that the transport chassis 102 is being hauled from one geographic location to another geographic location to transport a CTU or cargo. Thus, motion of the transport chassis 102 can be used as a trigger to the load status determination engine 118 to determine, based on further measurement data from another sensor (e.g., 112) of the transport chassis 102, a load status of the transport chassis 102.

As another example, the location determined by the position sensor 302 can be used as a trigger to determine whether the transport chassis 102 is loaded. For example, if the location of the transport chassis 102 is within or outside a specified area, then that is an indication that loading or unloading of a CTU or cargo may be performed, or that the transport chassis 102 may be transporting a CTU or cargo. Thus, the location of the transport chassis 102 can be used to trigger the determination by the load status determination engine 118 of whether or not the transport chassis 102 is loaded.

More generally, the load status determination engine 118 receives information of a location or movement of a transport chassis, and determines whether the transport chassis is loaded with a CTU or cargo further based on the information of the location or movement of the transport chassis.

In a specific example, a geofence can be defined, where a geofence specifies a geographic area. In some examples, if the transport chassis 102 is inside the geofence (e.g., within a dock yard), then that triggers the activation of the load status determination engine 118. In other examples, if the transport chassis 102 is outside the geofence, then that triggers the activation of the load status determination engine 118. More generally, the load status determination engine 118 determines whether the transport chassis 102 has a specified relationship with respect to a geofence, and determines whether the transport chassis 102 is loaded with a CTU or cargo further based on determining whether the transport chassis has the specified relationship with respect to the geofence.

In an example use case, a large number of transport chassis can be located in a dock yard of an enterprise. A dock yard refers to a facility where loading and unloading of transport chassis are performed. By being able to determine the load status of each transport chassis in the dock yard, a dock yard operator can quickly determine which transport chassis are loaded with a CTU or cargo, and which other transport chassis are unloaded. A loaded transport chassis can be moved to an unloading bay for unloading a CTU or cargo, while an unloaded transport chassis can be moved to a loading bay to load a CTU or cargo.

Figure 4:
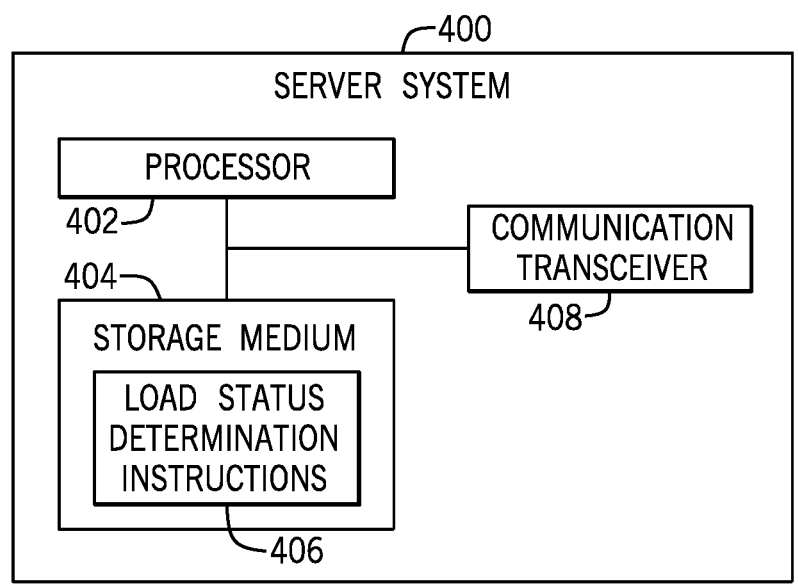
FIG. 4 is a block diagram of a system according to some implementations.

FIG. 4 is a block diagram of a server system 400 according to some examples (which can be similar to the server system 116 of FIG. 1). The server system 400 includes a processor 402 (or multiple processors). A processor can include a microprocessor, a core of a multi-core microprocessor, a microcontroller, a programmable integrated circuit, a programmable gate array, or another hardware processing circuit.

The system 400 further includes a non-transitory machine-readable or computer-readable storage medium 404 storing machine-readable instructions, such as load status determination instructions 406 that are executable on the processor 402 to perform various tasks as discussed in the present disclosure. Instructions executable on a processor can refer to the instructions executing on one processor or on multiple processors.

The system 400 includes a communication transceiver 408, such as a wireless transceiver to communicate wireless signals (e.g., radio frequency or RF signals).

The storage medium 404 can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A system comprising:
    at least one processor configured to:
        receive sensor data from a strain gauge of a transport chassis configured to carry a cargo transportation unit (CTU), wherein the sensor data is from the strain gauge that measures a strain of a suspension of the transport chassis; and
        determine, based on the sensor data and a profile learned based on past data, whether the transport chassis is loaded with the CTU or cargo.

2. The system of claim 1, wherein the sensor data is received over a network from a communication transceiver of the transport chassis.

3. A system comprising:
    at least one processor configured to:
        receive sensor data from a sensor of a transport chassis configured to carry a cargo transportation unit (CTU), wherein the sensor data comprises a signal characteristic of a wireless signal to be transmitted or received by a wireless transceiver of the transport chassis; and
        determine, based on the sensor data and a profile learned based on past data, whether the transport chassis is loaded with the CTU or cargo, wherein the at least one processor is configured to determine whether the transport chassis is loaded with the CTU or the cargo based on determining whether the signal characteristic is within a specified range of signal characteristic values indicating that the wireless signal is subject to interference by the CTU or the cargo.

4. The system of claim 3, wherein the signal characteristic is of the wireless signal to be communicated by the wireless transceiver over a wireless network.

5. The system of claim 3, wherein the signal characteristic is of the wireless signal for receipt by a Global Positioning (GPS) receiver.

6. The system of claim 1, wherein the at least one processor is configured to:
    receive image data from a camera of the transport chassis; and
    determine whether the transport chassis is loaded with the CTU or the cargo further based on determining whether the image data from the camera indicates that the sky is visible.

7. The system of claim 1, wherein the at least one processor is configured to:
    receive magnetic data from a magnetic field sensor of the transport chassis; and
    determine whether the transport chassis is loaded with the CTU or the cargo further based on determining whether the magnetic data indicates that a magnetic field is distorted by presence of the CTU or the cargo.

8. The system of claim 1, wherein the at least one processor is configured to:
    receive acceleration data from an accelerometer of the transport chassis; and
    determine whether the transport chassis is loaded with the CTU or the cargo further based on determining whether the acceleration data is within a specified range of acceleration data values indicating that the CTU or the cargo has been dropped on the transport chassis.

9. The system of claim 3, wherein the at least one processor is configured to:
    receive image data from a camera of the transport chassis, and
    determine whether the transport chassis is loaded with the CTU or the cargo further based on determining whether the image data from the camera indicates that the sky is visible.

10. The system of claim 1, wherein the at least one processor is configured to:
    receive the sensor data as part of a collection of events detected by different types of sensors of the transport chassis, the different types of sensors including the strain gauge,
    wherein the determining of whether the transport chassis is loaded with the CTU or the cargo is based on the collection of events.

11. The system of claim 1, wherein the at least one processor is configured to:
    receive information of a location or movement of the transport chassis; and
    determine whether the transport chassis is loaded with the CTU or the cargo further based on the information of the location or movement of the transport chassis.

12. The system of claim 1, wherein the at least one processor is configured to:

determine whether the transport chassis has a specified relationship with respect to a geofence; and determine whether the transport chassis is loaded with the CTU or the cargo further based on determining whether the transport chassis has the specified relationship with respect to the geofence.

13. A non-transitory storage medium storing instructions that upon execution cause a system to:

receive sensor data from a strain gauge that measures a strain of a suspension of a transport chassis configured to carry a cargo transportation unit (CTU), the suspension attached to a wheel of the transport chassis;

access profile data learned based on past determinations of load status performed by the system; and determine, based on the sensor data and the profile data, whether the transport chassis is loaded with the CTU or cargo.

14. The non-transitory storage medium of claim 13, wherein the instructions upon execution cause the system to further:

receive a signal characteristic of a wireless signal transmitted or received by a wireless transceiver of the transport chassis, wherein the determining of whether the transport chassis is loaded with the CTU or the cargo is further based on determining whether the signal characteristic is within a specified range of signal characteristic values indicating that the wireless signal is subject to interference by the CTU or the cargo.

15. The non-transitory storage medium of claim 14, wherein the instructions upon execution cause the system to determine that the transport chassis is not loaded with the CTU or the cargo based on determining that the signal characteristic is outside the specified range of signal characteristic values.

16. The non-transitory storage medium of claim 13, wherein the instructions upon execution cause the system to further:

compute likelihoods of a loaded status corresponding to measurement data from a plurality of sensors including the strain gauge, wherein the determining of whether the transport chassis is loaded with the CTU or the cargo is based on the likelihoods.

17. The non-transitory storage medium of claim 13, wherein the instructions upon execution cause the system to further:

trigger the determining in response to a location or motion of the transport chassis determined based on a further sensor of the transport chassis.

18. A method comprising:

receiving, by a system comprising a processor, a collection of events that are produced responsive to measurement data of corresponding sensors of a transport chassis, the sensors comprising a strain gauge on a suspension attached to a wheel of the transport chassis; and determining, by the system based on the collection of events and a profile learned based on past data, whether the transport chassis is loaded with a cargo transportation unit (CTU) or cargo.

19. The method of claim 18, wherein the sensors further comprise one or more of:

a signal characteristic sensor, an optical sensor, a camera, a magnetic field sensor, an accelerometer, a position sensor, and a motion sensor.

20. The system of claim 3, wherein the at least one processor is configured to:

determine that the transport chassis is loaded with the CTU or the cargo based on determining that the signal characteristic is within the specified range of signal characteristic values; and determine that the transport chassis is not loaded with the CTU or the cargo based on determining that the signal characteristic is outside the specified range of signal characteristic values.

* * * * *